US012647454B2

(12) United States Patent (10) Patent No.: US 12,647,454 B2
Tsirkin (45) Date of Patent: Jun. 2, 2026

(54) TIMEOUT HANDLING FOR VIRTUAL DEVICES

(71) Applicant: Red Hat, Inc., Raleigh, NC (US)

(72) Inventor: Michael Tsirkin, Raanana (IL)

(73) Assignee: Red Hat, LLC, Raleigh, NC (US)

( * ) Notice: Subject to any disclaimer, the term of this patent is extended or adjusted under 35 U.S.C. 154(b) by 445 days.

(21) Appl. No.: 17/900,128

(22) Filed: Aug. 31, 2022

(65) Prior Publication Data

US 2024/0073243 A1 Feb. 29, 2024

(51) Int. Cl.
*H04L 9/40* (2022.01)
*G06F 9/455* (2018.01)

(52) U.S. Cl.
CPC ...... *H04L 63/1458* (2013.01); *G06F 9/45558* (2013.01); *G06F 2009/45587* (2013.01)

(58) Field of Classification Search
CPC ............. H04L 63/1458; G06F 9/45558; G06F 2009/45587
See application file for complete search history.

(56) References Cited

U.S. PATENT DOCUMENTS 8,291,414 B2 * 10/2012 Bansal .................. G06F 9/4881
718/1
2013/0297802 A1 * 11/2013 Laribi ................. H04L 12/6418
709/226

2017/0046187 A1 * 2/2017 Tsirkin ................ G06F 9/45558
2019/0087215 A1 * 3/2019 Bhandari .................. G06F 1/14
2020/0341785 A1 * 10/2020 Tsirkin ................ G06F 9/45558
2021/0208918 A1 7/2021 Singleton et al.

OTHER PUBLICATIONS

He, Zecheng et al., "Machine Learning Based DDoS Attack Detection from Source Side in Cloud," 2017 IEEE 4th International Conference on Cyber Security and Cloud Computing, https://www.researchgate.net/publication/318666877, Jun. 2017, 8 pages.
Khanh, Tran Nam et al., "Attempt TCP ACK-Storm based Virtual Network Attacks and Defence Solutions," https://assets.researchsquare.com/files/rs-420162/v1_covered.pdf?c=1641510704 (preprint), Jan. 6, 2022, 12 pages.
Krishna, E. S. Phalguna et al., "Managing DDoS Attacks on Virtual Machines by Segregated Policy Management," Global Journal of Computer Science and Technology: Network, Web & Security, vol. 1, Issue 6, Version 1.0, Global Journals Inc., https://core.ac.uk/download/pdf/231163126.pdf, 2014, 7 pages.

(Continued)

*Primary Examiner* — Noura Zoubair
(74) *Attorney, Agent, or Firm* — Dority & Manning, P.A.

(57) ABSTRACT

A virtual device can be provided to a virtual machine from a hypervisor. The virtual can correspond to a backend element accessible to the VM via communications with the virtual device. The hypervisor can intercept a communication from the VM directed to the backend element via the virtual device. The hypervisor can set a timer. The timer can track an elapsed time from the communication to a response from the backend element. The hypervisor can send the communication from the virtual machine to the backend element. The timer can then be determined to have expired without a response being received. The virtual device can then be disabled.

19 Claims, 8 Drawing Sheets

(56)                    References Cited

OTHER PUBLICATIONS

Nguyen, Son Doc et al., "SVTester: Finding DoS Vulnerabilities of Virtual Switches," Journal of Information Processing, vol. 29, 581-591, DOI: 10.2197/ipsjip.29.581, https://www.jstage.jst.go.jp/article/ipsjip/29/0/29_581/_pdf, Dec. 1, 2020, 11 pages.

Ruo, Ando et al., "A Load Balancing System for Mitigating DDoS Attacks Using Live Migration of Virtual Machines," https://www.researchgate.net/publication/294785868, Jun. 2008, 7 pages.

Salahuddin, Mohammad A. et al., "Chronos: DDoS Attack Detection using Time-based Autoencoder," IEEE Transactions on Network and Service Management, DOI: 10.1109/TNSM.2021.3088326, https://www.researchgate.net/publication/294785868, Jun. 2021, 16 pages.

Zhijun, Wu et al., "Low-Rate DDoS Attack Detection Based on Factorization Machine in Software Defined Network," IEEE Access, https://ieeexplore.ieee.org/stamp/stamp.jsp?arnnumber=8962081, Jan. 17, 2020, 15 pages.

* cited by examiner

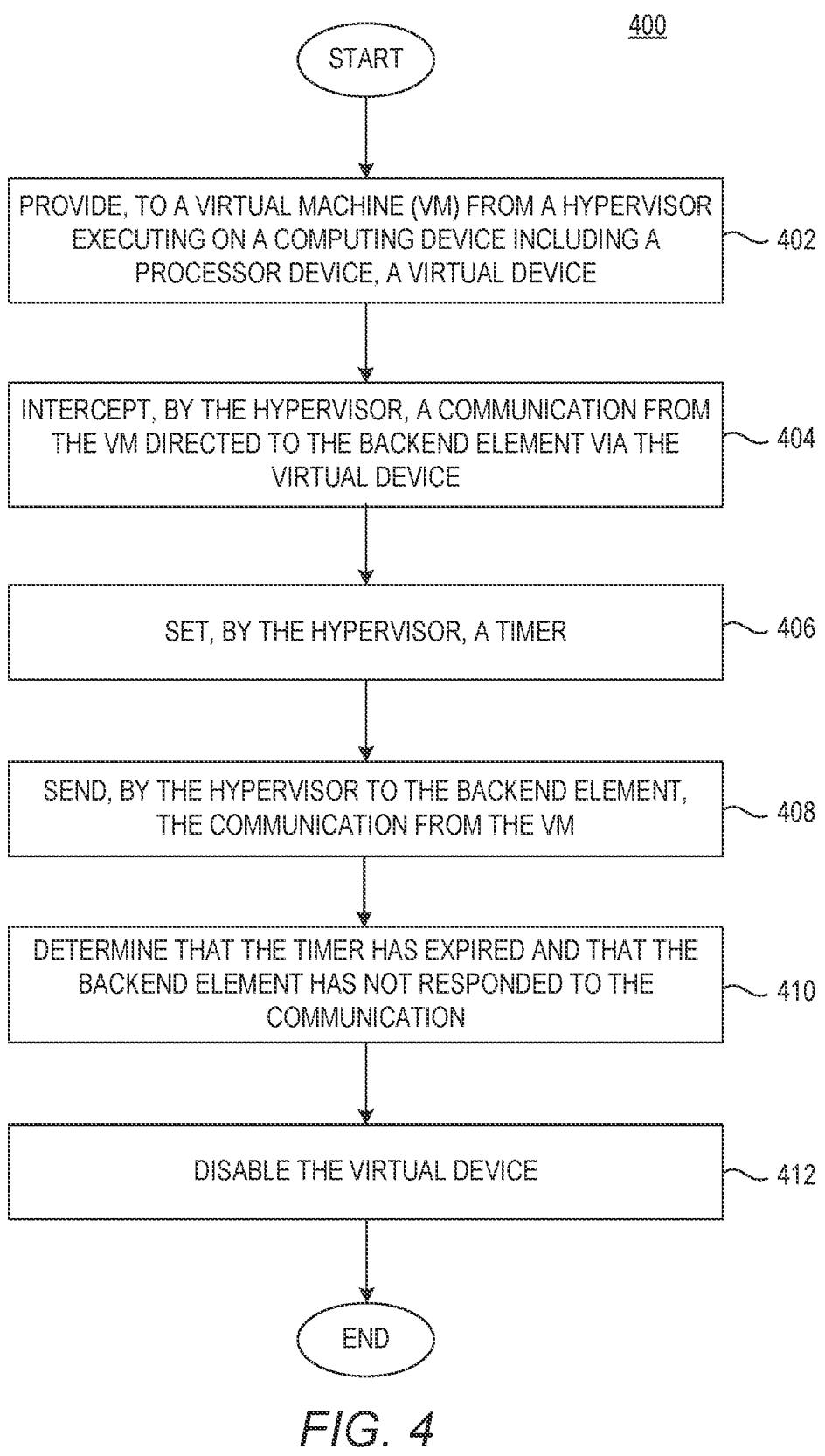

400

START

PROVIDE, TO A VIRTUAL MACHINE (VM) FROM A HYPERVISOR EXECUTING ON A COMPUTING DEVICE INCLUDING A PROCESSOR DEVICE, A VIRTUAL DEVICE — 402

INTERCEPT, BY THE HYPERVISOR, A COMMUNICATION FROM THE VM DIRECTED TO THE BACKEND ELEMENT VIA THE VIRTUAL DEVICE — 404

SET, BY THE HYPERVISOR, A TIMER — 406

SEND, BY THE HYPERVISOR TO THE BACKEND ELEMENT, THE COMMUNICATION FROM THE VM — 408

DETERMINE THAT THE TIMER HAS EXPIRED AND THAT THE BACKEND ELEMENT HAS NOT RESPONDED TO THE COMMUNICATION — 410

DISABLE THE VIRTUAL DEVICE — 412

END

*FIG. 4*

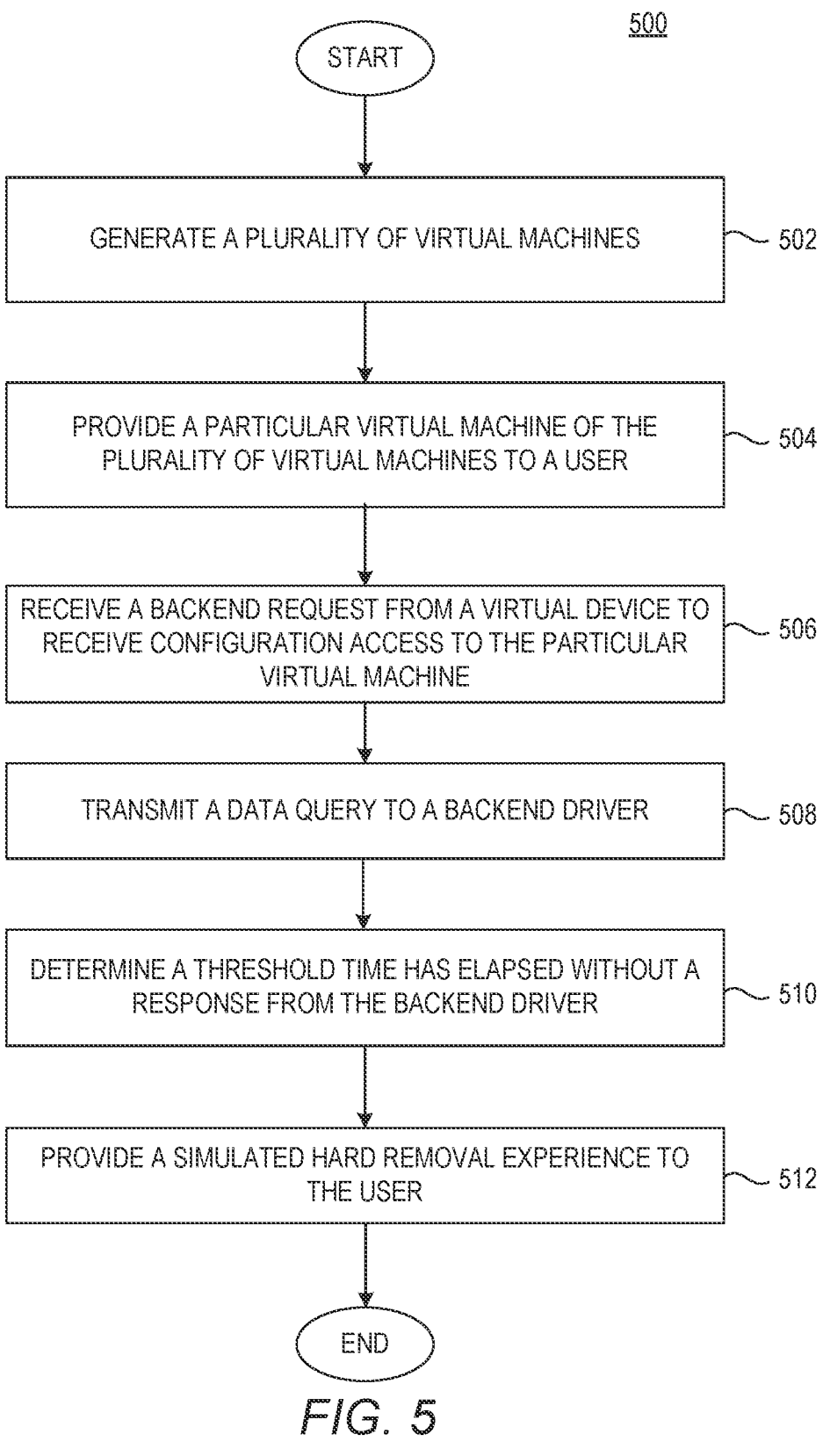

500

START

GENERATE A PLURALITY OF VIRTUAL MACHINES — 502

PROVIDE A PARTICULAR VIRTUAL MACHINE OF THE PLURALITY OF VIRTUAL MACHINES TO A USER — 504

RECEIVE A BACKEND REQUEST FROM A VIRTUAL DEVICE TO RECEIVE CONFIGURATION ACCESS TO THE PARTICULAR VIRTUAL MACHINE — 506

TRANSMIT A DATA QUERY TO A BACKEND DRIVER — 508

DETERMINE A THRESHOLD TIME HAS ELAPSED WITHOUT A RESPONSE FROM THE BACKEND DRIVER — 510

PROVIDE A SIMULATED HARD REMOVAL EXPERIENCE TO THE USER — 512

END

TIMEOUT HANDLING FOR VIRTUAL DEVICES

BACKGROUND

Hypervisors can be utilized to generate one or more virtual machines that can be allocated backend resources of a physical computing device. The one or more virtual machines may interact with virtual devices to perform one or more actions. Virtual devices can request access to backend elements in order to provide particular capabilities associated with the virtual device.

SUMMARY

The examples implement mechanisms for timeout handling for a virtual device used by a virtual machine.

In one example, a method can be provided. The method can include providing, to a virtual machine (VM) from a hypervisor executing on a computing device comprising a processor device, a virtual device. The virtual device can correspond to a backend element accessible to the VM via communications with the virtual device. The hypervisor can be configured to intercept communications with the virtual device by the VM. The method can include intercepting, by the hypervisor, a communication from the VM directed to the backend element via the virtual device. The method can include setting, by the hypervisor, a timer. The timer can track an elapsed time from the communication to a response from the backend element. The method can include sending, by the hypervisor to the backend element, the communication from the VM. The method can include determining that the timer has expired and that the backend element has not responded to the communication. The method can include disabling the virtual device in response to determining that the timer has expired and that the backend element has not responded to the communication.

In another example, a computing system can be provided. The computing system can include a memory and a processor device coupled to the memory. The processor device is to provide, to a virtual machine (VM) from a hypervisor executing on a computing device including a processor device, a virtual device. The virtual device can correspond to a backend element accessible to the VM via communications with the virtual device. The hypervisor can be configured to intercept communications with the virtual device by the VM. The processor device is further to intercept, by the hypervisor, a communication from the VM directed to the backend element via the virtual device. The processor device is further to set, by the hypervisor, a timer. The timer can track an elapsed time from the communication to a response from the backend element. The processor device is further to send, by the hypervisor to the backend element, the communication from the VM. The processor device is further to determine that the timer has expired and that the backend element has not responded to the communication. The processor device is further to disable the virtual device.

In yet another example, a non-transitory computer-readable storage medium can be provided. The non-transitory computer-readable storage medium can include executable instructions to cause one or more processor devices of one or more computing devices to perform one or more operations. The instructions can cause the one or more processor devices to generate, by a hypervisor, a plurality of virtual machines. Each of the plurality of virtual machines can be associated with a respective portion of computational resources of a computing device. The instructions can further cause the one or more processor devices to provide a particular virtual machine of the plurality of virtual machines to a user. The particular virtual machine can include a guest operating system. The instructions can further cause the one or more processor devices to receive a backend request from a virtual device to receive configuration access to the particular virtual machine. The configuration access can be associated with accessing computational resources of the computing device to at least one of augment data or generate data to provide a virtual device experience. The virtual device can be communicatively paired with the hypervisor. The instructions can further cause the one or more processor devices to transmit a data query to a backend driver. The instructions can further cause the one or more processor devices to determine a threshold time has elapsed without a response from the backend driver. The instructions can further cause the one or more processor devices to provide a simulated hard removal experience to the user. The simulated hard removal experience can include blocking resource access privileges for the virtual device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 4 depicts a flow chart diagram of an example method to perform timeout handling for virtual devices according to example implementations of the present disclosure.

FIG. 5 depicts a flow chart diagram of an example method to perform timeout handling for virtual devices according to example implementations of the present disclosure.

DETAILED DESCRIPTION

Figure 1:
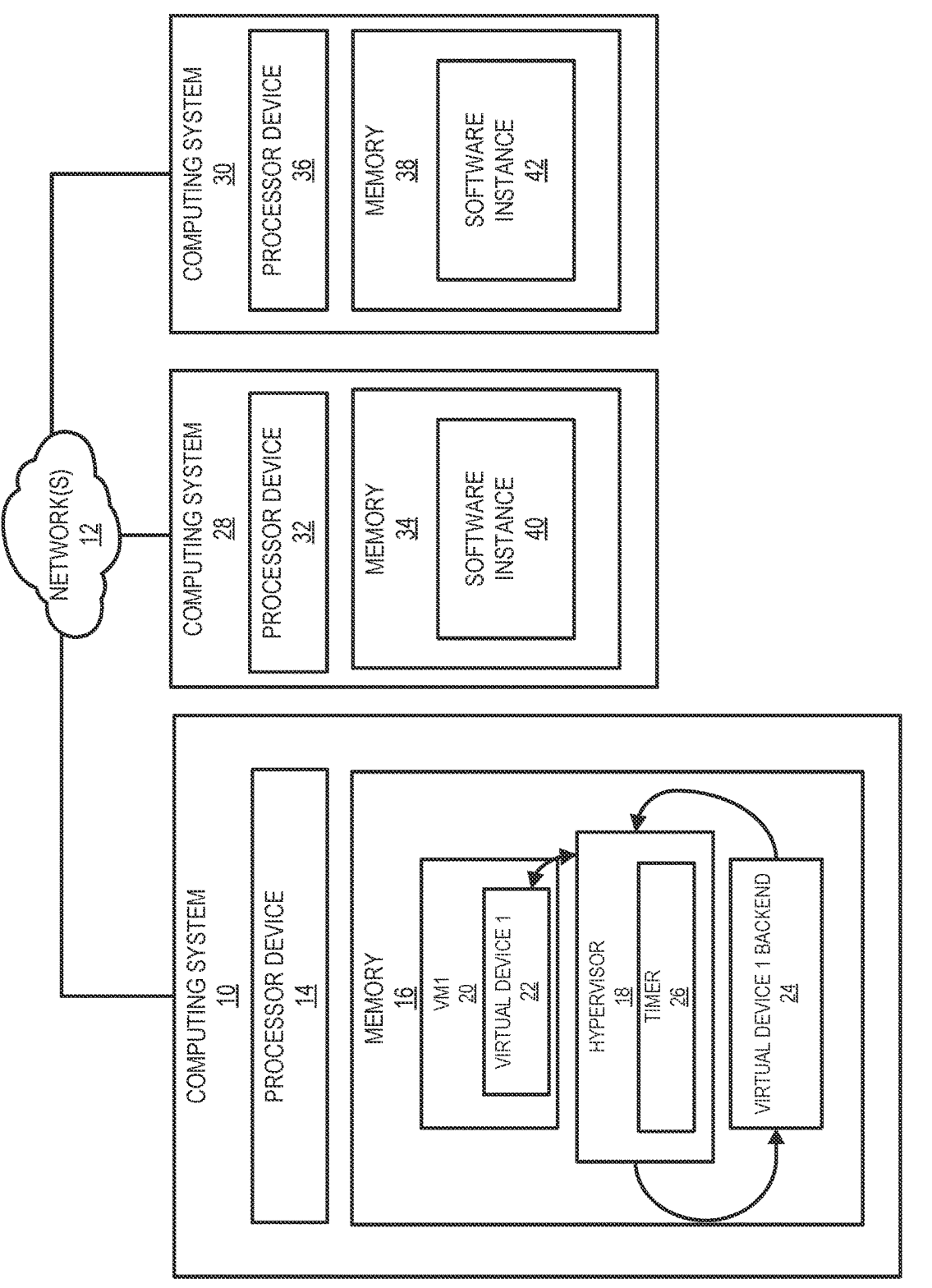
FIG. 1 is a block diagram of an environment in which timeout handling for virtual devices can be practiced according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Hypervisors can be utilized to generate one or more virtual machines. The virtual machines can be allocated computing resources of a physical computing device in order to emulate a physical machine. The hypervisor can therefore generate a plurality of virtual machines with a single physical computing device in order to emulate a plurality of physical devices.

The virtual machines can additionally interact and/or interface with one or more virtual devices that may provide capabilities normally provided via physical devices (e.g., providing network access via a virtual networking device and/or providing storage access via a virtual storage device). The virtual devices may utilize one or more backend elements to implement the desired function. The utilization may occur in response to one or more communications with the one or more backend elements. However, in instances where the virtual device is an untrusted device and/or includes malicious data, the communication may stall the CPU and/or a virtual CPU for an extended period of time and/or forever. The issue can cause a denial-of-service.

The timeout handling of virtual devices can mitigate and/or eliminate the potential for a denial-of-service by simulating a hard removal of the virtual device in response to a threshold time occurring before receiving a response from the backend element. For example, the hypervisor can intercept communication from the virtual device to the backend element. The hypervisor can then set a timer when transmitting the communication to the backend element, and, if the timer reaches a threshold time without receiving a response from the backend element, the virtual device can be disabled. Disabling the device can include blocking access to computing resources of the virtual machine. Additionally and/or alternatively, disabling the virtual device can include blocking configuration access. The disabling of the device can include providing an emulated surprise removal of the virtual device from the virtual machine. The emulated surprise removal can leverage the hypervisor to convert a catastrophic failure (e.g., a malicious device causing a denial-of-service) to a recoverable error for the user (e.g., the guest virtual machine utilized by the user).

In some implementations, the guest interfacing with and/or utilizing the virtual machine may be provided with a notification that is descriptive of a hard removal of the virtual device. The notification may be generated and transmitted based on the timer expiration.

The various implementations of the present disclosure provide a number of technical effects and benefits. As one example, the implementations can include timeout handling of virtual devices. For example, the hypervisor disclosed herein can intercept and track communications between a virtual device and one or more backend elements. The hypervisor can then disable the virtual device in response to a timeout event occurring.

Another technical benefit of the various implementations of the present disclosure is the ability to leverage a hypervisor to emulate a hard removal of the virtual device. For example, the implementations disclosed herein can emulate a hard removal of the virtual device to provide an intuitive event for the guest utilizing the virtual machine.

Another example of technical effect and benefit relates to improved computational efficiency and improvements in the functioning of a computing system. For example, one or more implementations disclosed herein can leverage the timeout handling of virtual devices to reduce the likelihood of denials-of-service that can block the utilization of computational resources.

FIG. 1 is a block diagram of an environment suitable for implementing an example optimization of a pipeline of services according to example implementations of the present disclosure. A computing system 10 can be communicatively connected to a network 12. Additionally and/or alternatively, the computing system 10 can include processor device(s) 14 and memory 16. In some implementations, the computing system 10 may be a computing system that includes multiple computing devices. Alternatively, in some implementations, the computing system 10 may be one or more computing devices within a computing system that includes multiple computing devices. Similarly, the processor device(s) 14 may include any computing or electronic device capable of executing software instructions to implement the functionality described herein.

The memory 16 can be or otherwise include any device(s) capable of storing data, including, but not limited to, volatile memory (random access memory, etc.), non-volatile memory, storage device(s) (e.g., hard drive(s), solid state drive(s), etc.). The memory 16 of the computing system 10 can store data that can include and/or be utilized to implement a hypervisor 18 according to the present disclosure.

For example, the hypervisor 18 can facilitate the generation of a plurality of virtual machines, which can include a first virtual machine 20. The first virtual machine 20 can be allocated a portion of the computational resources of the computing system 10, which can include a portion of the processing resources of the processor device 14 and/or a portion of the storage resources of the memory 16.

The first virtual machine 20 can interface with a plurality of virtual devices including a first virtual device 22. The first virtual device 22 can perform a function similar to a physical device. For example, the first virtual device 22 may be a virtual storage device that operates similarly to a physical storage device (e.g., a solid state drive and/or a hard drive). Alternatively and/or additionally, the first virtual device 22 may be a virtual networking device that operates similar to a physical networking device (e.g., a router, a bridge, a hub, a gateway, and/or a WiFi adapter). The term "virtual device" as used herein refers to software that forms an interface between a guest operating system (OS) and a hypervisor via which the guest OS may access a backend element, such as a storage device, a software-implemented function, a network interface, or the like. Generally, an interaction of the guest OS with the virtual device (e.g., a read operation, a write operation, or the like) may be intercepted by the hypervisor and eventually forwarded or otherwise provided to the backend element.

The plurality of virtual devices may interact with one or more backend elements to perform the given function. For example, a first virtual device 22 may utilize a first backend element 24 to perform a first given function (e.g., a networking function and/or a storage function. The utilization may be initialized based on a communication sent from the first virtual device 22 to the first backend element 24.

In some implementations, the hypervisor 18 can intercept the communication. The hypervisor 18 can then set (or start) a timer 26. The timer 26 can track the elapsed time from the transmission of the communication to the backend element 24 until a receipt of a response from the backend element 24. In response to a threshold time lapsing without a response, the hypervisor 18 can disable the first virtual device 22. The process can occur iteratively and may occur for every additional interaction by the first virtual device 22. Alternatively and/or additionally, the first virtual device 22 may be blocked from any future interactions with the first backend element 24 in response to the disabling event. A notification may be generated and transmitted to a user of the first virtual machine 20 in response to the expiration of the time as tracked by the timer 26.

Additionally and/or alternatively, an emulated surprise removal of the first virtual device 22 may occur. The emulated surprise removal can convert the potential catastrophic failure to a recoverable error for the user of the first virtual machine 20. The emulated surprise removal can include unmapping the first virtual device 22 from the first virtual machine 20 and/or the computing system 10. Additionally and/or alternatively, the emulated surprise removal can include ignoring future write and read requests from the first virtual device. In some implementations, the unhandled request may be reported, which can include setting flags in the PCI controller and/or returning all ones pattern from read. The emulated surprise removal can include blocking the first virtual device 22 from accessing memory 16 and/or sending interrupts by unmapping guest memory and interrupting the range of the first virtual device 22 (e.g., therefore, following device accesses can cause a fault for the first virtual device 22). The user of the first virtual machine 20 may be provided with a notification that has indicated the first virtual device 22 has been removed via a surprise removal (e.g., by sending an interrupt).

In some implementations, if a response is received from the backend element 24 before the time has expired, the first virtual device 22 may be provided configuration access to the virtual machine 20. For example, the first virtual device 22 may be provided configuration access to the operating system of the first virtual machine 20.

Additionally and/or alternatively, the first virtual machine 20 may interact with a plurality of virtual devices. Each of the plurality of virtual devices may generate and transmit their own respective communication, which can be intercepted and/or tracked by the hypervisor 18 and the timer 26. Each of the plurality of devices may be determined individually, and/or in combination, to be given configuration access to one or more backend elements.

Additionally and/or alternatively, the hypervisor 18 may generate a plurality of virtual machines and may facilitate the use of a plurality of virtual devices for each respective virtual machine.

In some implementations, the computing system 10 can communicate with one or more other computing systems (e.g., a second computing system 28 and/or a third computing system 30). A second computing system 28 can be communicatively connected to the network 12. Additionally and/or alternatively, the second computing system 28 can include processor device(s) 32 and memory 34. In some implementations, the second computing system 28 may be a computing system that includes multiple computing devices. Alternatively, in some implementations, the second computing system 28 may be one or more computing devices within a computing system that includes multiple computing devices. Similarly, the processor device(s) 32 may include any computing or electronic device capable of executing software instructions to implement the functionality described herein.

The memory 34 can be or otherwise include any device(s) capable of storing data, including, but not limited to, volatile memory (random access memory, etc.), non-volatile memory, storage device(s) (e.g., hard drive(s), solid state drive(s), etc.).

A third computing system 30 can be communicatively connected to the network 12. Additionally and/or alternatively, the third computing system 30 can include processor device(s) 36 and memory 38. In some implementations, the third computing system 30 may be a computing system that includes multiple computing devices. Alternatively, in some implementations, the third computing system 30 may be one or more computing devices within a computing system that includes multiple computing devices. Similarly, the processor device(s) 36 may include any computing or electronic device capable of executing software instructions to implement the functionality described herein.

The memory 38 can be or otherwise include any device(s) capable of storing data, including, but not limited to, volatile memory (random access memory, etc.), non-volatile memory, storage device(s) (e.g., hard drive(s), solid state drive(s), etc.).

The memory 34 of the second computing system 28 can store a software instance 40, and the memory 38 of the third computing system 30 can store a software instance 42. The software instance 40 and the software instance 42 can include a user interface for interacting with one or more virtual machines provided via the hypervisor 18 of the computing system 10. Alternatively and/or additionally, the software instance 40 and the software instance 42 may be associated with one or more virtual devices (e.g., the first virtual device 22).

Hypervisors can be utilized to generate one or more virtual machines that can run in isolation from other virtual machines. The virtual machine 20 can include an operating system. In some implementations, one or more virtual devices may interact with the virtual machine 20. For example, an operating system device on a Type-1 hypervisor may be utilized. PCI may be utilized as a transport in this implementation.

Another example can be user space devices for a Type-2 hypervisor. One issue that may occur is a read/write of the configuration space can potentially block resources for an extended period of time and/or forever, as the backend may be untrusted and may cause a denial-of-service. The issue can cause the virtual CPU to stall for an extended period of time and/or forever.

A timer 26 can be facilitated by the hypervisor, which can be utilized to time an interaction. In response to a time expiration, a timeout can be implemented by the hypervisor. However, guests may not really expect configuration accesses to timeout.

To help prevent denial-of-service by an untrusted backend, the hypervisor 18 can run the timer 26 on each configuration access. If the timer 26 expires before the backend element 24 has responded, the hypervisor 18 can proceed to emulate a surprise removal of the device from the guest.

To this end, the virtual device 22 can be unmapped from the guest operating system. Additional write and read accesses from the particular virtual device 22 can then be ignored except for possibly reporting an unhandled request (e.g. setting flags in the PCI controller).

The virtual device 22 can be blocked from accessing memory 16 or sending interrupts by unmapping guest memory and may interrupt range from device. Additional virtual device accesses may cause an error to occur for the virtual device 22 based on the blocked access. In some implementations, the guest interfacing with the virtual machine 20 may be notified that the virtual device 22 has been removed by sending an interrupt. The hypervisor 18 can therefore convert a catastrophic failure (e.g., a malicious device causing a denial-of-service) to a recoverable error for guests.

Figure 2A:
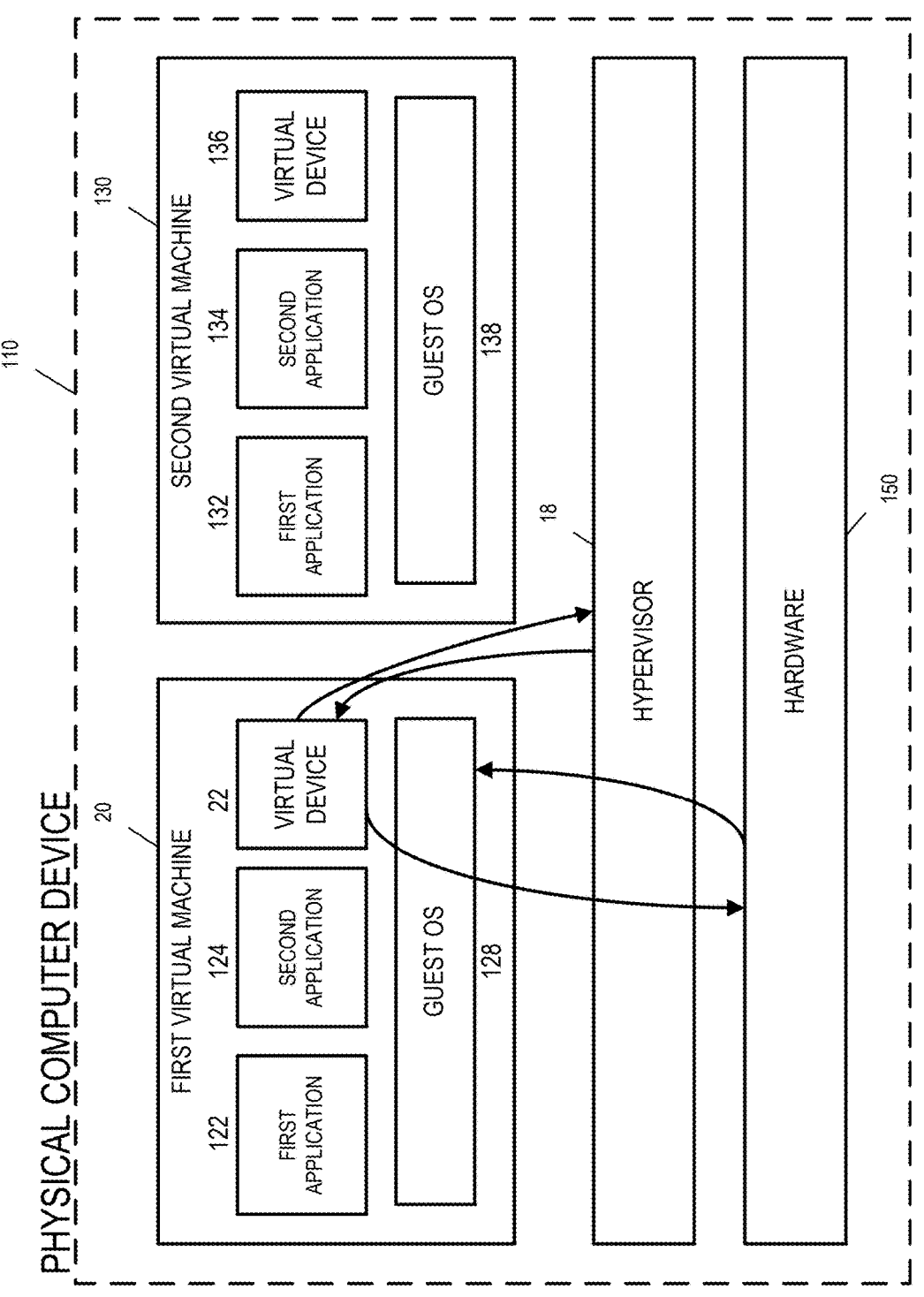
FIGS. 2A-2B depict block diagrams of example timeout handling for virtual devices according to example implementations of the present disclosure.

FIG. 2A depicts a block diagram of an example timeout handling for virtual devices according to example implementations of the present disclosure. In particular, FIG. 2A depicts a block diagram of timeout handling for virtual devices on a physical computer device 110 with a Type-1 hypervisor. The physical computer device 110 can be part of the computing system 10. The physical computer device 110 can be a user computing device, a server computing device, and/or a mobile computing device. The physical computer device 110 can include a processor device 14 and a memory 16. Additionally and/or alternatively, the physical computer device 110 can include a hypervisor 18 (e.g., a Type-1 hypervisor).

The hypervisor 18 can generate a first virtual machine 20, which can run a first application 122 and a second application 124. Additionally and/or alternatively, the first virtual machine 20 can interface with a first virtual device 22. The first virtual machine 20 may run a first guest operating system 128.

Additionally and/or alternatively, the hypervisor 18 can generate a second virtual machine 130, which can run a first application 132 and a second application 134. Additionally and/or alternatively, the second virtual machine 130 can interface with a second virtual device 136. The second virtual machine 130 may run a second guest operating system 138.

The first applications (i.e., 122 and 132) may be the same and/or may differ. The second applications (i.e., 124 and 134) may be the same and/or may differ. Additionally and/or alternatively, the guest operating systems (e.g., 128 and 138) may be the same and/or may differ.

In some implementations, the first virtual device 22 and the second virtual device 136 may be the same and/or may differ. The hypervisor 18 may store interactions with the first virtual device 22 and the second virtual device 136 and may determine whether the particular virtual device has configuration access in one virtual device based on historical data associated with interactions with the other virtual machine. Alternatively and/or additionally, each virtual device interaction may be monitored individually.

The virtual device(s) may utilize hardware 150 of the physical computer device 110 including one or more physical hardware devices. For example, the first virtual device 22 can generate and send a communication, which can be intercepted by the hypervisor 18. The hypervisor 18 can then transmit the communication to a backend element 24 of the hardware 150 and can set a timer 26 to track the time from transmission till response. If a response is not received from the backend element 24 within a threshold time (e.g., a set time expires), the hypervisor 18 may facilitate the disabling of the first virtual device. A similar process can be performed for the second virtual device 136.

Figure 2B:
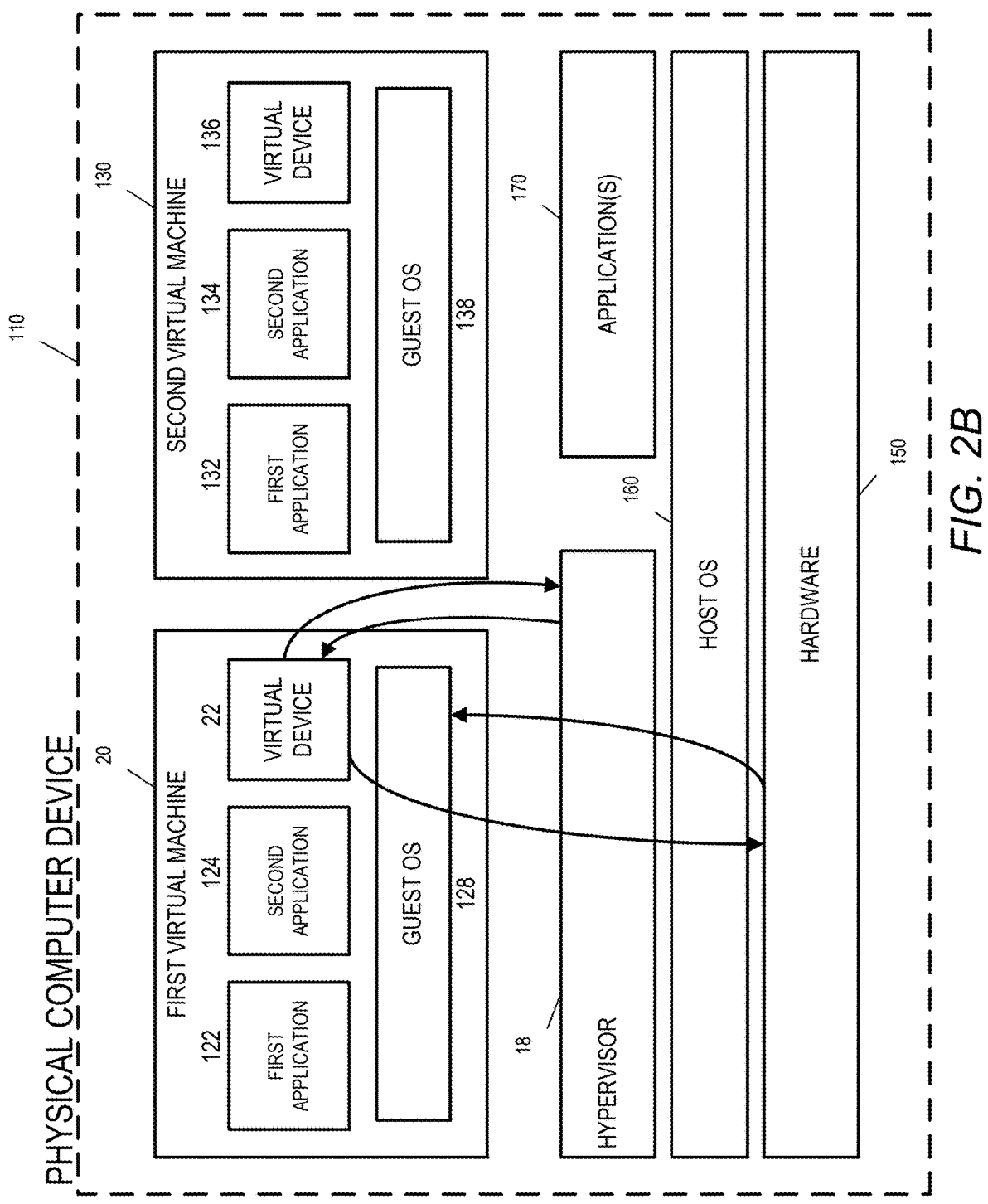

FIG. 2B depicts a block diagram of an example timeout handling for virtual devices according to example implementations of the present disclosure. In particular, FIG. 2B depicts a block diagram of timeout handling for virtual devices on a physical computer device 110 with a Type-2 hypervisor. The physical computer device 110 can be part of the computing system 10. The physical computer device 110 can be a user computing device, a server computing device, and/or a mobile computing device. The physical computer device 110 can include a processor device 14 and a memory 16. Additionally and/or alternatively, the physical computer device 110 can include a hypervisor 18 (e.g., a Type-2 hypervisor).

The physical computer device 110 with the Type-2 hypervisor may perform timeout handling for virtual devices similar to the physical computer device 110 of FIG. 2A. However, the Type-2 hypervisor configuration may further include a host operating system 160 and/or one or more host applications 170 that are stored and perform functions outside of a virtual machine partition. Additionally, and/or alternatively, the host operating system 160 and/or the one or more host applications 170 may be utilized to manage the hypervisor 18, the hardware 150, and/or the virtual machines.

The timeout handling for virtual devices can include facilitating emulated hard removals of virtual devices in response to a determined timeout. For example, the hypervisor 18 can generate a first virtual machine 20, which can run a first application 122 and a second application 124. Additionally and/or alternatively, the first virtual machine 20 can interface with a first virtual device 22. The first virtual machine 20 may run a first guest operating system 128.

Additionally and/or alternatively, the hypervisor 18 can generate a second virtual machine 130, which can run a first application 132 and a second application 134. Additionally and/or alternatively, the second virtual machine 130 can interface with a second virtual device 136. The second virtual machine 130 may run a second guest operating system 138.

The first applications (i.e., 122 and 132) may be the same and/or may differ. The second applications (i.e., 124 and 134) may be the same and/or may differ. Additionally and/or alternatively, the guest operating systems (e.g., 128 and 138) may be the same and/or may differ.

In some implementations, the first virtual device 22 and the second virtual device 136 may be the same and/or may differ. The hypervisor 18 may store interactions with the first virtual device 22 and the second virtual device 136 and may determine whether the particular virtual device has configuration access in one virtual device based on historical data associated with interactions with the other virtual machine. Alternatively and/or additionally, each virtual device interaction may be monitored individually.

The virtual device(s) may utilize hardware 150 of the physical computer device 110 including one or more physical hardware devices. For example, the first virtual device 22 can generate and send a communication, which can be intercepted by the hypervisor 18. The hypervisor 18 can then transmit the communication to a backend element 24 of the hardware 150 and can set a timer 26 to track the time from transmission till response. If a response is not received from the backend element 24 within a threshold time (e.g., a set time expires), the hypervisor 18 may facilitate the disabling of the first virtual device. A similar process can be performed for the second virtual device 136.

Figure 3:
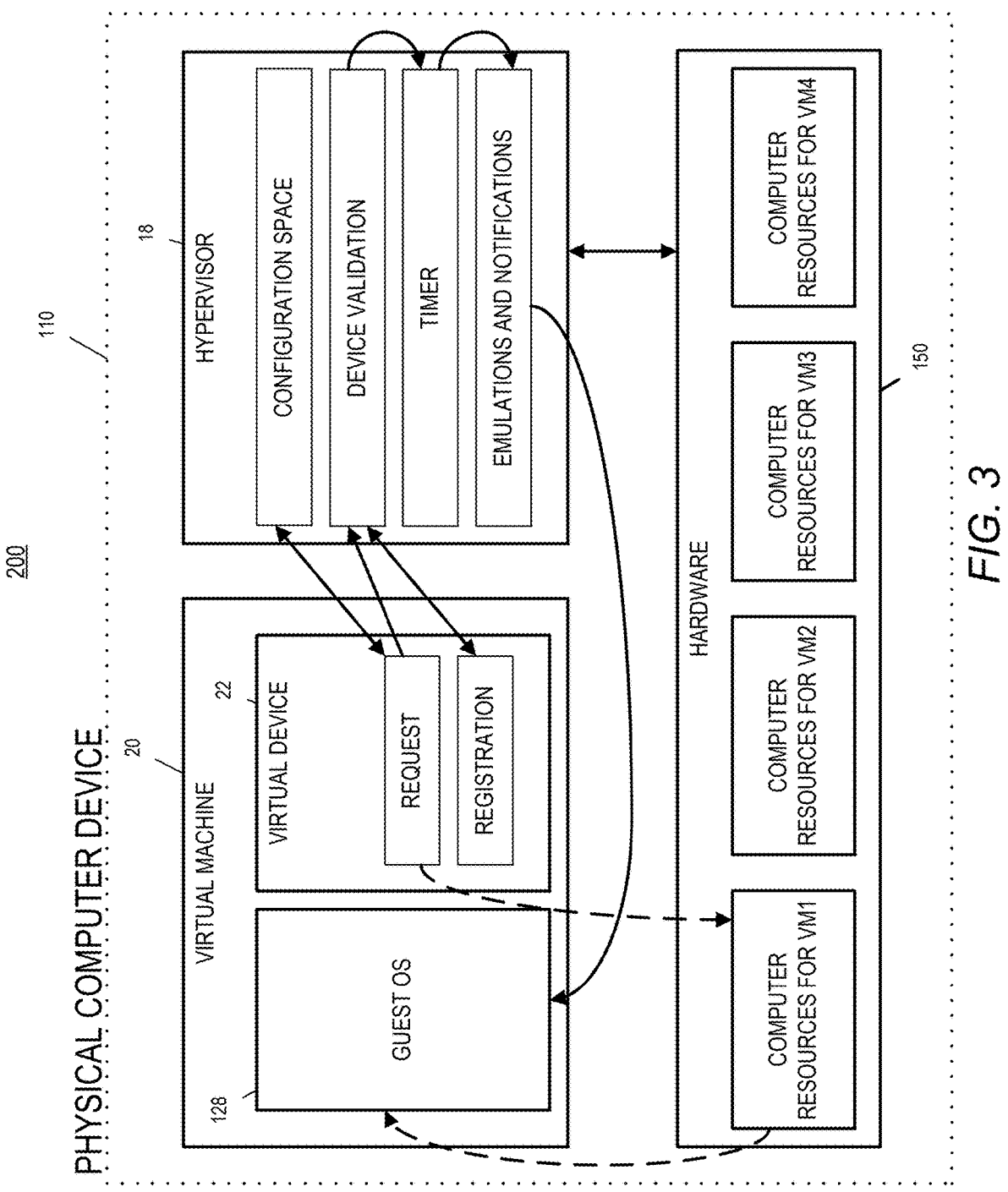
FIG. 3 depicts a block diagram of an example timeout handling for virtual devices according to example implementations of the present disclosure.

FIG. 3 depicts a block diagram of an example timeout handling for virtual devices according to example implementations of the present disclosure. The physical computer device 110 of FIG. 3 may utilize a Type-1 hypervisor or may utilize a Type-2 hypervisor. The physical computer device 110 can be part of the computing system 10 and may include a hypervisor 18. The hypervisor 18 can be utilized to generate a virtual machine 20, which can run a guest operating system 128. Additionally and/or alternatively, the physical computer device 110 can include hardware, and the hardware 150 can include computational resources. The computational resources may be apportioned to a plurality of virtual machines generated by the hypervisor 18.

A virtual device 22 may request access to computer resources (e.g., a backend element 24) for the first virtual machine 20. The request may be a generated communication that can be intercepted by the hypervisor 18. The hypervisor 18 may perform device validation to determine whether to provide configuration access to the virtual device 22. Device validation may occur based on past interactions (e.g., based on registration of the virtual device 22 in a historical log of previously interacted with virtual devices) and/or may be performed based on a new virtual device and/or may be performed for each instance regardless of past interactions. Device validation may include setting a timer 26 and transmitting the communication to a backend element 24 of the hardware 150.

If a response is received from the backend element 24 before an expiration of a set time, the virtual device 22 may be provided configuration access to interact with backend elements and/or the guest operating system 128.

Alternatively and/or additionally, if a response is not received from the backend element 24 before a set time has elapsed, the virtual device 22 may be disabled. Disabling the virtual device 22 can include emulating a hard removal and/or generating and providing a notification to the virtual machine 20.

Because the hypervisor 18 can be a component of the computing system 10 (e.g., a component of a computing device), functionality implemented by the hypervisor 18 may be attributed to the computing system 10 generally. Moreover, in examples where the hypervisor 18 includes software instructions that program the processor device 14 to carry out functionality discussed herein, functionality implemented by the hypervisor 18 may be attributed herein to the processor device 14.

Because the hypervisor 18 can be a component of the computer system 10, functionality implemented by the hypervisor 18 may be attributed to the computer system 10 generally. Moreover, in examples where the hypervisor 18 includes software instructions that program a processor device to carry out functionality discussed herein, functionality implemented by the hypervisor 18 may be attributed herein to one or more processor devices 14 of the computer system 10.

Finally, it is noted that while, for purposes of illustration and simplicity, the implementations are illustrated as being implemented by computer system that comprises a single computing device that in turn comprises a single processor device, in practice the examples/implementations disclosed herein may be implemented in a computer system that comprises any number of computing devices, each of which may comprise one or more processor devices. Thus, irrespective of the implementation, the examples/implementations may be implemented on a computer system that includes one or more computing devices, wherein the one or more computing devices comprise one or more processor devices, and the one or more processor devices are configured to implement functionality disclosed herein.

FIG. 4 depicts a flow chart diagram of an example method to perform timeout handling for virtual devices according to example implementations of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system 10 can provide, to a virtual machine (VM) 20 from a hypervisor 18 executing on a computing device including a processor device 14, a virtual device 22. The virtual device 22 can correspond to a backend element 24 accessible to the VM 20 via communications with the virtual device 22. The hypervisor 18 can be configured to intercept communications with the virtual device 22 by the VM 20. In some implementations, the hypervisor 18 can be communicatively connected with the VM 20. The hypervisor 18 can be communicatively connected with hardware of the computing device. In some implementations, the hypervisor 18 can facilitate usage of the hardware of the computing device by the VM 20. The virtual device 22 can include a virtual storage device. The backend element 24 can include a storage device. Alternatively and/or additionally, the virtual device 22 can include a virtual network interface. The backend element 24 can include a network interface.

In some implementations, the hypervisor 18 can generate a plurality of virtual machines. Each of the plurality of virtual machines can be allocated a portion of computing resources of the computing device. Each of the plurality of virtual machines can operate in isolation from other virtual machines of the plurality of virtual machines. The hypervisor 18 may provide the VM 20 in parallel with other virtual machines of the plurality of virtual machines.

In some implementations, the backend element 24 can include a networking device to obtain backend data. The backend data can be descriptive of information for interacting with backend resources. Alternatively and/or additionally, the backend element 24 can include an operating device to adjust operating system data. The operating system data can include information for providing an operating system of the VM 20. In some implementations, the processor device 14 can be further to provide, via the VM 20, a user interface of an operating system. The backend element 24 can be associated with the operating system.

At 404, the computing system 10 can intercept, by the hypervisor 18, a communication from the VM 20 directed to the backend element 24 via the virtual device 22. For example, the virtual device 22 may generate a communication to request configuration access for a particular backend element 24 (e.g., a networking device, a storage device, and/or operating device). The virtual device 22 can then attempt to transmit the communication to the backend element 24, and the hypervisor 18 can intercept the communication.

At 406, the computing system 10 can set, by the hypervisor 18, a timer 26. The timer 26 can track an elapsed time from the communication to a response from the backend element 24. To set the timer 26, the hypervisor 18 can access an internal clock of the computing device and track the elapsed time.

At 408, the computing system 10 can send, by the hypervisor 18 to the backend element 24, the communication from the VM 20. In some implementations, the communication can be sent in response to and/or in parallel to the timer 26 being set.

At 410, the computing system 10 can determine that the timer 26 has expired and that the backend element 24 has not responded to the communication. Determining that the timer 26 has expired can include determining the elapsed time of the timer 26 is above a threshold time. Additionally and/or alternatively, determining that the timer 26 has expired can include determining the threshold time based at least in part on historical processing data of the computing device.

At 412, the computing system 10 can disable the virtual device 22. Disabling the virtual device 22 can include unmapping the virtual device 22 from the VM 20. In some implementations, disabling the virtual device 22 can include invalidating one or more table page entries of the computing device. The one or more table page entries may be associated with the virtual device 22. Disabling the virtual device 22 can include blocking virtual device access to a memory 16 of the computing device.

In some implementations in response to determining that the timer 26 has expired and that the backend element 24 has not responded to the communication, the computing system 10 can generate a notification. The notification can be descriptive of the virtual device 22 being disabled. The computing system 10 can provide the notification for display via a user interface. In some implementations, the hypervisor 18 can emulate a surprise removal of the virtual device 22. The emulated surprise removal can include unmapping the virtual device 22, blocking computer resource access, and/or sending a notification to the user of the virtual machine 20.

Additionally and/or alternatively, the computing system 10 can intercept, by the hypervisor, a second communication from the virtual device 22 directed to the backend element 24 and can prevent transmission of the second communication based on the virtual device 22 being disabled.

In some implementations, the virtual device 22 may be disabled based on one or more other data points. For example, the virtual device 22 may be disabled based on a computational cost of utilizing the virtual device 22. Alternatively and/or additionally, the hypervisor 18 may intercept the communication, the communication can be processed, and the virtual device 22 may be disabled based on the data in the communication (e.g., the communication may be determined to have malicious software and/or may have unknown data packets).

In some implementations, the computing system 10 can provide a notification to an operating system of the virtual machine 20, wherein the notification is descriptive of a removal of the virtual device 22 without coordination with the operating system. For example, the notification of the removal may be utilized to emulate a surprise removal of the virtual device 22 from the virtual machine 20. The emulated surprise removal can be descriptive of the virtual device 22 crashing, being forcefully removed without communication with the operating system, and/or being removed via another form of surprise removal.

Alternatively and/or additionally, the computing system 10 can provide a user experience to a user via a user interface of the virtual machine 20. The user experience can be descriptive of an emulated surprise removal of the virtual device 22. The user experience can include notifying the user that the virtual device 22 was removed. Additionally and/or alternatively, the user experience can include unmapping the virtual device 22 and/or blocking access to computer resources (e.g., memory 16 and/or processing).

FIG. 5 depicts a flow chart diagram of an example method to perform timeout handling for virtual devices according to example implementations of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system 10 can generate a plurality of virtual machines. The plurality of virtual machines may be generated by and/or managed by a hypervisor 18. Each of the plurality of virtual machines can be associated with a respective portion of computational resources of a computing device. Each of the plurality of virtual machines may perform one or more actions in isolation from the other virtual machines. For example, a particular machine may perform a processing action that is performed without interfering with the processing actions of one or more other virtual machines. The plurality of virtual machines can emulate a plurality of physical computing devices by partitioning the computing resources of one or more physical computing devices.

At 504, the computing system 10 can provide a particular virtual machine 20 of the plurality of virtual machines to a user. The particular virtual machine 20 can include a guest operating system. The guest operating system of the particular virtual machine 20 may differ from the operating system of one or more other virtual machines of the plurality of virtual machines.

At 506, the computing system 10 can receive a backend request from a virtual device 22 to receive configuration access to the particular virtual machine 20. The configuration access can be associated with accessing computational resources of the computing device to at least one of augment data or generate data to provide a virtual device experience. In some implementations, the virtual device 22 can be communicatively paired with the hypervisor.

At 508, the computing system 10 can transmit a data query to a backend element 24 (e.g., a backend driver). The data query can be associated with a request for configuration access. For example, the data query can query for structured data for configuring the access.

At 510, the computing system 10 can determine a threshold time has elapsed without a response from the backend driver. The threshold time can be based on historical data, heuristics, machine-learned parameters, user-input data, and/or manufacturer settings.

At 512, the computing system 10 can provide a simulated hard removal experience to the user. The simulated hard removal experience can include blocking resource access privileges for the virtual device 22. In some implementations, the simulated hard removal experience can include blocking resource access privileges for the virtual device 22 and providing a notification via the particular virtual machine 20. The notification can be descriptive of the virtual device 22 being removed. The simulated hard removal experience can include emulating a surprise removal of the virtual device 22. For example, the simulated hard removal experience can include providing a similar experience to if a physical device being removed from a physical machine without notice (e.g., a USB storage drive removed from a USB port of a desktop computer without notice being provided).

Figure 6:
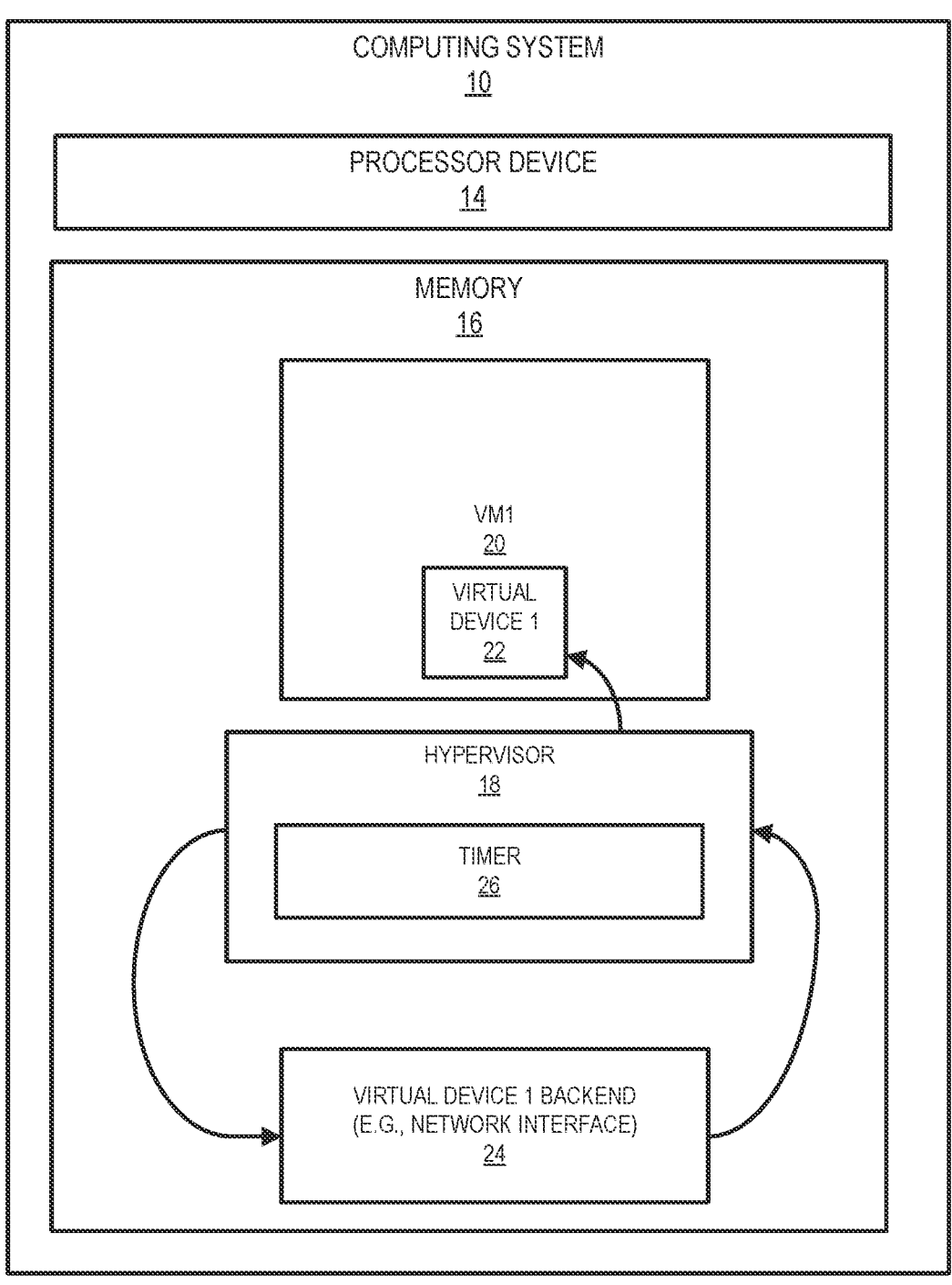
FIG. 6 is a simplified block diagram of the environment illustrated in FIG. 1 according to one implementation.

FIG. 6 is a simplified block diagram of the environment illustrated in FIG. 1 according to one implementation. The environment can include the computing system 10, which in turn includes the processor device 14 and the memory 16. The processor device 14 is coupled to the memory 16. The processor device 14 is to provide, to a virtual machine (VM) 20 from a hypervisor 18, a virtual device 22. The virtual device 22 can correspond to a backend element 24 accessible to the VM 20 via communications with the virtual device. The hypervisor can be configured to intercept communications with the virtual device 22 by the VM 20. The processor device 14 is further to intercept, by the hypervisor 18, a communication from the VM 20 directed to the backend element 24 via the virtual device 22. The processor device 14 is further to set, by the hypervisor 18, a timer 26. The timer 26 can track an elapsed time from the communication to a response from the backend element 24. The processor device 14 is further to send, by the hypervisor 18 to the backend element 24, the communication from the VM 20. The processor device 14 is further to determine that the timer 26 has expired and that the backend element 24 has not responded to the communication. The processor device 14 is further to disable the virtual device 22.

Figure 7:
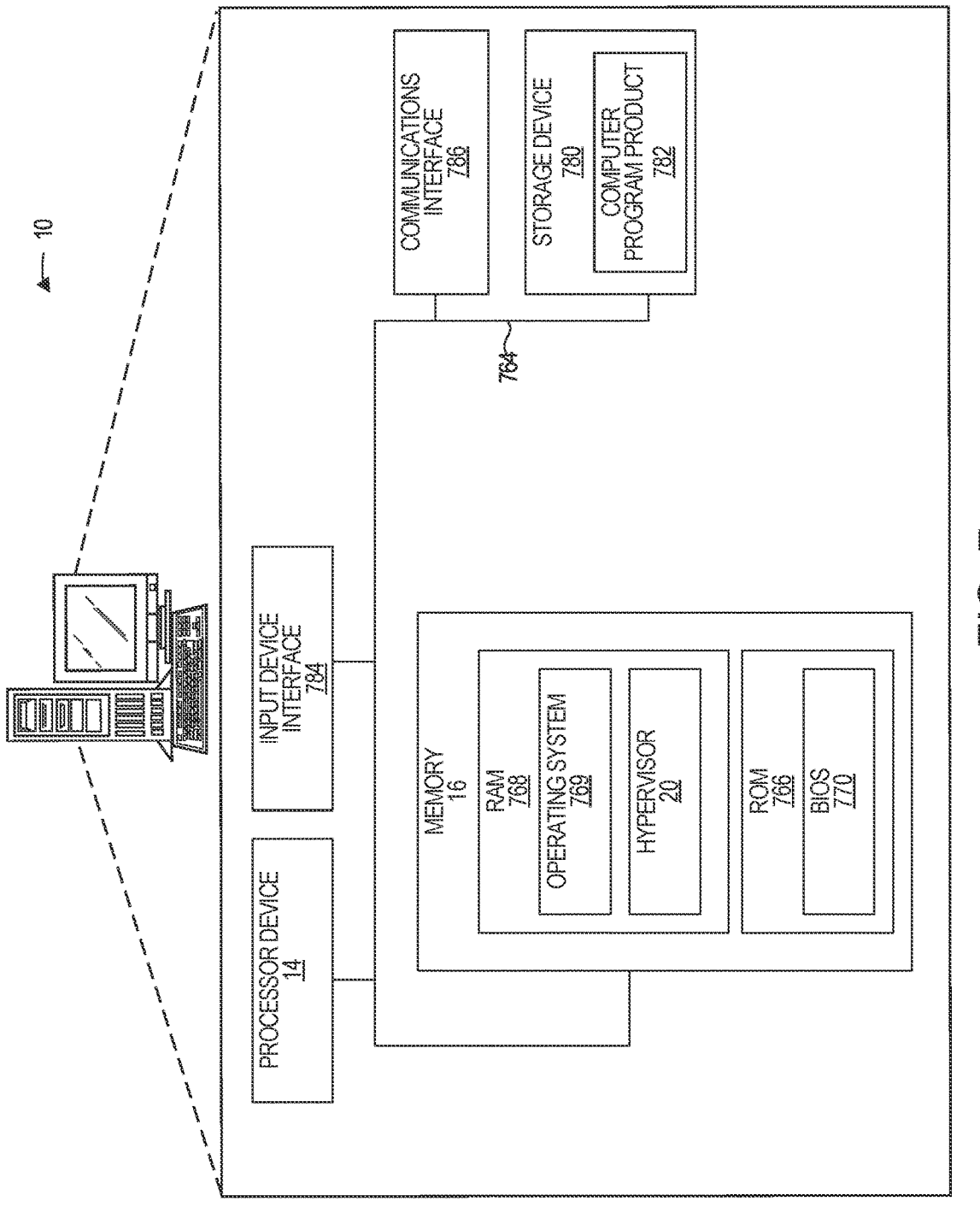
FIG. 7 depicts a block diagram of an example computing system that performs timeout handling for virtual devices according to example implementations of the present disclosure.

FIG. 7 is a block diagram of the computing system 10 suitable for implementing examples according to one example. The computing system 10 may comprise any computing or electronic device capable of including firmware, hardware, and/or executing software instructions to implement the functionality described herein, such as a computer server, a desktop computing device, a laptop computing device, a smartphone, a computing tablet, or the like. The computing system 10 includes the processor device 14, the system memory 16, and a system bus 64. The system bus 764 provides an interface for system components including, but not limited to, the system memory 16 and the processor device 14. The processor device 14 can be any commercially available or proprietary processor.

The system bus 764 may be any of several types of bus structures that may further interconnect to a memory bus (with or without a memory controller), a peripheral bus, and/or a local bus using any of a variety of commercially available bus architectures. The system memory 16 may include non-volatile memory 766 (e.g., read-only memory (ROM), erasable programmable read-only memory (EPROM), electrically erasable programmable read-only memory (EEPROM), etc.), and volatile memory 768 (e.g., random-access memory (RAM)). A basic input/output system (BIOS) 770 may be stored in the non-volatile memory 66 and can include the basic routines that help to transfer information between elements within the computing system 10. The volatile memory 68 may also include a high-speed RAM, such as static RAM, for caching data.

The computing system 10 may further include or be coupled to a non-transitory computer-readable storage medium such as the storage device, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 780 and other drives associated with computer-readable media and computer-usable media may provide non-volatile storage of data, data structures, computer-executable instructions, and the like.

A number of modules can be stored in the storage device 780 and in the volatile memory 768, including an operating system 769 and one or more program modules, such as the file transfer module, which may implement the functionality described herein in whole or in part. All or a portion of the examples may be implemented as a computer program product 782 stored on a transitory or non-transitory computer-usable or computer-readable storage medium, such as the storage device 780, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the file transfer module in the volatile memory 768, may serve as a controller, or control system, for the computing system 10 that is to implement the functionality described herein. For example, the processor device 14, in conjunction with the file transfer module in the volatile memory 768, may serve as a controller for the hypervisor 18 that can facilitate the virtual device and backend element interactions.

An operator, such as the user, may also be able to enter one or more configuration commands through a keyboard (not illustrated), a pointing device such as a mouse (not illustrated), or a touch-sensitive surface such as a display device. Such input devices may be connected to the processor device 14 through an input device interface 784 that is coupled to the system bus 764 but can be connected by other interfaces such as a parallel port, an Institute of Electrical and Electronic Engineers (IEEE) 1394 serial port, a Universal Serial Bus (USB) port, an IR interface, and the like.

The computing system 10 may also include the communications interface 786 suitable for communicating with the network 12 as appropriate or desired. The computing system 10 may also include a video port configured to interface with the display device, to provide information to the user.

Individuals will recognize improvements and modifications to the preferred examples of the disclosure. All such improvements and modifications are considered within the scope of the concepts disclosed herein and the claims that follow.

What is claimed is:

1. A method comprising:

generating, by a hypervisor executing on a computing device comprising a processor device, a virtual machine (VM) that provides to a user access to computational resources of the computing device;

providing, to the VM from the hypervisor, a virtual device, the virtual device corresponding to a backend element accessible to the VM via communications with the virtual device, wherein the hypervisor is configured to intercept communications with the virtual device by the VM;

intercepting, by the hypervisor, a communication from the VM directed to the backend element via the virtual device, determining a period of time to receive a response from the backend element based at least in part on historical processing data of the computing device;

setting, by the hypervisor, a timer to the period of time to receive the response from the backend element;

sending, by the hypervisor to the backend element, the communication from the VM;

determining that the timer has expired and that the backend element has not responded to the communication;

in response to determining that the timer has expired and that the backend element has not responded to the communication, disabling, by the hypervisor and without coordination with a guest operating system of the VM, the virtual device from accessing the backend element, wherein disabling the virtual device comprises an emulated hard removal of the virtual device, wherein the emulated hard removal comprises ignoring future write and read requests from the virtual device: and reporting ignored write and read requests by setting flags in a PCI controller;

intercepting, by the hypervisor, a second communication from the virtual device directed to the backend element; and preventing, by the hypervisor, transmission of the second communication based on the virtual device being disabled from accessing the backend element.

2. The method of claim 1, wherein disabling the virtual device from accessing the backend element comprises unmapping the virtual device from the VM.

3. The method of claim 1, further comprising:

in response to determining that the timer has expired and that the backend element has not responded to the communication, generating a notification, wherein the notification is descriptive of the virtual device being disabled; and providing the notification for display via a user interface.

4. The method of claim 1, wherein disabling the virtual device from accessing the backend element comprises invalidating one or more table page entries of the computing device, wherein the one or more table page entries are associated with the virtual device.

5. The method of claim 1, wherein disabling the virtual device from accessing the backend element comprises blocking virtual device access to a memory of the computing device.

6. The method of claim 1, further comprising:

generating, via the hypervisor, a plurality of virtual machines, wherein each of the plurality of virtual machines are allocated a portion of computing resources of the computing device, and wherein each of the plurality of virtual machines operate in isolation from other virtual machines of the plurality of virtual machines.

7. The method of claim 6, further comprising:

providing, via the hypervisor, the VM in parallel with other virtual machines of the plurality of virtual machines.

8. The method of claim 1, wherein the backend element comprises a networking device to:

obtain backend data, wherein the backend data is descriptive of information for interacting with backend resources.

9. The method of claim 1, wherein the backend element comprises an operating device to:

adjust operating system data, wherein the operating system data comprises information for providing the guest operating system of the VM.

10. The method of claim 1, wherein determining that the timer has expired comprises: determining an elapsed time of the timer is above a threshold time.

11. The method of claim 1, further comprising:

providing a notification to the guest operating system of the VM, wherein the notification is descriptive of a removal of the virtual device without coordination with the guest operating system.

12. The method of claim 1, wherein the virtual device comprises a virtual storage device, and wherein the backend element comprises a storage device.

13. The method of claim 1, wherein the hypervisor is communicatively connected with the VM, wherein the hypervisor is communicatively connected with hardware of the computing device, and wherein the hypervisor facilitates usage of the hardware of the computing device by the VM.

14. The method of claim 1, wherein the virtual device comprises a virtual network interface, and wherein the backend element comprises a network interface.

15. A computing system comprising: a memory; and a processor device coupled to the memory to:

generate, by a hypervisor executing on a computing device comprising a processor device, a virtual machine (VM) that provides to a user access to computational resources of the computing device;

provide, to the VM from the hypervisor, a virtual device, the virtual device corresponding to a backend element accessible to the VM via communications with the virtual device, wherein the hypervisor is configured to intercept communications with the virtual device by the VM;

intercept, by the hypervisor, a communication from the VM directed to the backend element via the virtual device;

determine a period of time to receive a response from the backend element based at least in part on historical processing data of the computing device;

set, by the hypervisor, a timer to the period of time to receive the response from the backend element;

send, by the hypervisor to the backend element, the communication from the VM; determine that the timer has expired and that the backend element has not responded to the communication;

in response to determining that the timer has expired and that the backend element has not responded to the communication, disable, by the hypervisor and without coordination with a guest operating system of the VM, the virtual device from accessing the backend element, wherein disabling the virtual device comprises an emulated hard removal of the virtual device, wherein the emulated hard removal comprises ignoring future write and read requests from the virtual device; and report ignored write and read requests by setting flags in a PCI controller;

intercept, by the hypervisor, a second communication from the virtual device directed to the backend element; and prevent, by the hypervisor, transmission of the second communication based on the virtual device being disabled from accessing the backend element.

16. The computing system of claim 15, wherein to set the timer, the processor device is further to:

access, via the hypervisor, an internal clock of the computing device; and tracking, via the hypervisor, an elapsed time.

17. The computing system of claim 15, wherein the processor device is further to:

provide, via the VM, a user interface of the guest operating system of the VM; and wherein the backend element is associated with a host operating system.

18. A non-transitory computer-readable storage medium that includes executable instructions to cause one or more processor devices of one or more computing devices to:

generate, by a hypervisor, a plurality of virtual machines, wherein each of the plurality of virtual machines are associated with a respective portion of computational resources of a computing device;

provide a particular virtual machine of the plurality of virtual machines to a user, wherein the particular virtual machine comprises a guest operating system;

receive a backend request from a virtual device to receive configuration access to the particular virtual machine, wherein the configuration access is associated with accessing computational resources of the computing device to provide the virtual device to the particular virtual machine, wherein the virtual device is communicatively paired with the hypervisor;

transmit, by the hypervisor via the virtual device, a data query received from the particular virtual machine, to a backend driver;

determine a threshold time to receive a response from the backend driver based at least in part on historical processing data of the computing device; determine the threshold time has elapsed without the response from the backend driver;

in response to determining that the threshold time has elapsed without the response from the backend driver, provide a simulated hard removal of the virtual device, wherein the simulated hard removal of the virtual device comprises blocking resource access privileges for the virtual device, wherein the simulated hard removal of the virtual device comprises disabling, by the hypervisor and without coordination with the guest operating system, the virtual device from accessing the backend driver, wherein disabling the virtual device comprises ignoring future write and read requests from the virtual device; and reporting ignored write and read requests by setting flags in a PCI controller;

intercept, by the hypervisor, a second communication from the virtual device directed to the backend element; and prevent, by the hypervisor, transmission of the second communication based on the virtual device being disabled from accessing the backend driver.

19. The non-transitory computer-readable medium of claim 18, wherein the simulated hard removal comprises:

blocking resource access privileges for the virtual device; and providing a notification via the particular virtual machine, wherein the notification is descriptive of the virtual device being removed.

* * * * *